Patented Oct. 14, 1941

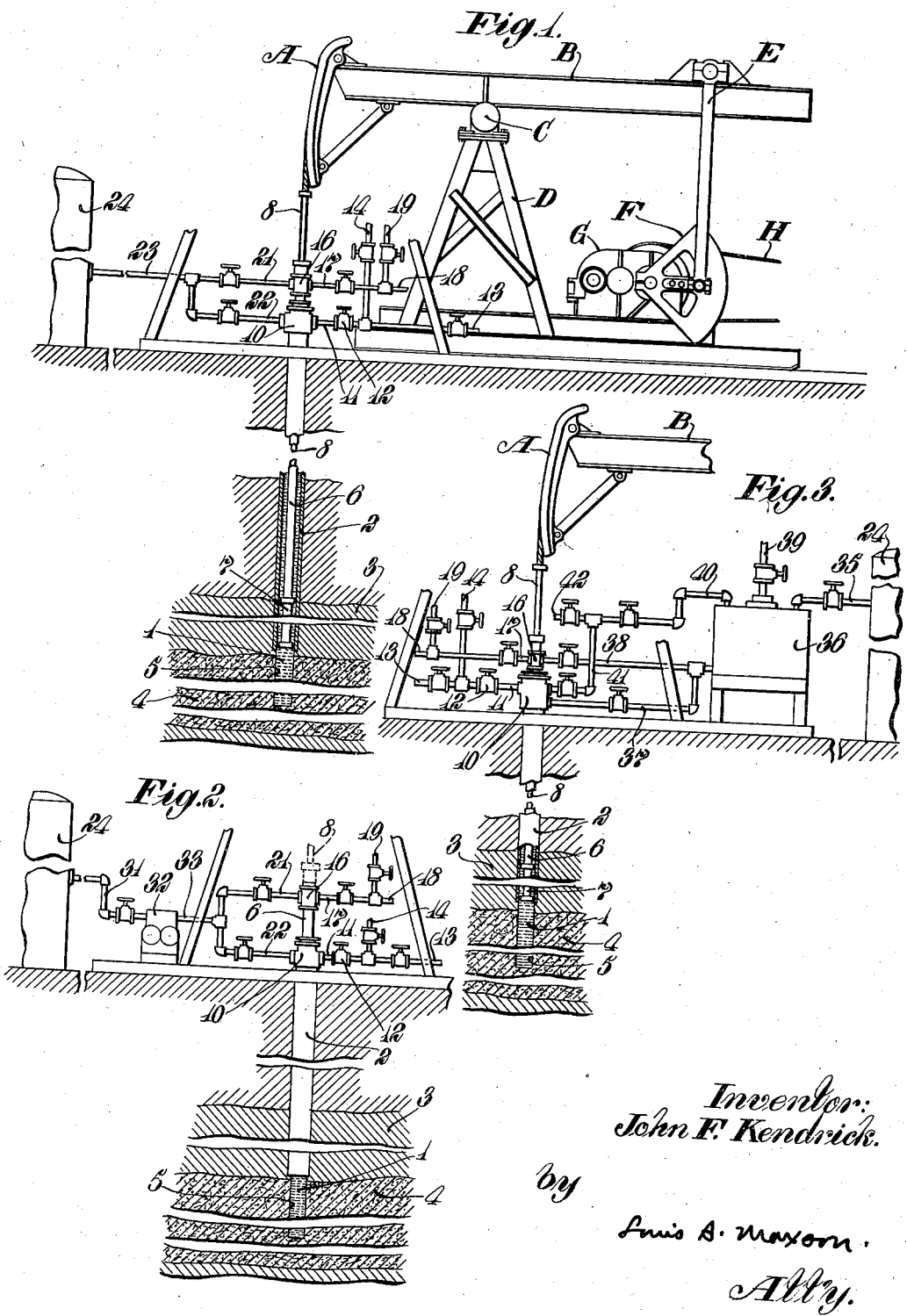

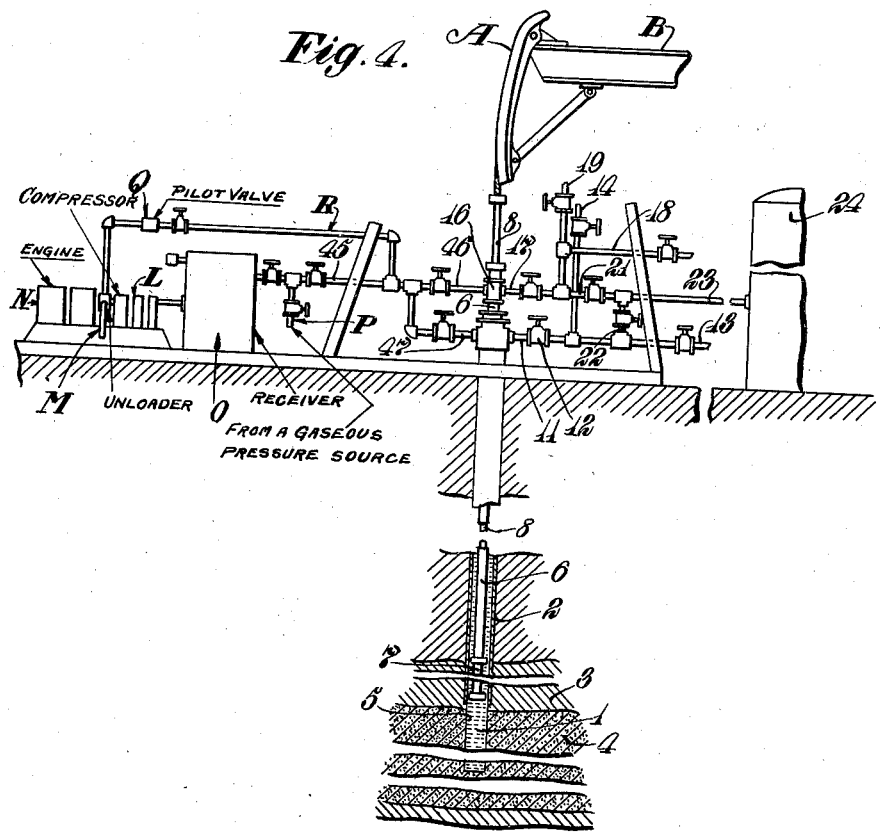

2,258,615

UNITED STATES PATENT OFFICE 2,258,615

APPARATUS FOR THE TREATMENT AND PRODUCING OF OIL-WATER WELLS

John F. Kendrick, Chicago, Ill., assignor to Sullivan Machinery Company, a corporation of Massachusetts Application February 28, 1938, Serial No. 193,161

11 Claims. (Cl. 166—1)

This invention relates to apparatus for the treatment and producing of oil wells, and more particularly to improved apparatus for the treatment and producing of so-called oil-water wells for the purpose of increasing the proportion of oil in the liquid produced therefrom.

In many oil fields the producing formation is permeated, prior to commencement of production, in its lower portions by water which is under pressure. Under such conditions, water usually ultimately appears in the well discharge, and the quantity of water usually increases with continued production, until ultimately the wells may be producing large quantities of liquid of which but a small percentage may be oil. The total quantity of fluid produced is, most frequently, determined by the capacity of the available pumping equipment; and increases in rate of operation, or even in capacity, of pumping equipment commonly do not increase materially the ratio of oil to water. It is to such wells that the present invention has, it is believed, its maximum applicability, but it is to be understood that when an artificial water drive is applied to a gas-drive field, there may develop conditions so analogous to those above mentioned as to provide opportunity for a most beneficial application of this invention in one or another of its embodiments. It should be further borne in mind that there may be other conditions under which the disadvantages of having the oil produced attended by serious quantities of water may be overcome by the use of the present invention.

In my copending application Serial No. 193,160 various methods of treating and producing oil-water wells are disclosed and claimed. This present application relates to apparatus for the carrying out of such methods.

According to the present invention, from a major aspect, apparatus is provided by means of which a well may be treated so as to restore, to availability for oil delivery, portions of the formation adjacent the well that have become water-sealed, as it were, and by means of which, upon the renewal of production, conditions may be established and maintained to preclude or at least delay renewed water ingress in objectionable quantities.

It is an object of my invention to provide an improved apparatus for treating and producing oil-water wells. It is another object of my invention to provide an improved apparatus for treating oil-producing formations. It is still another object of my invention to provide an improved apparatus for treating the wells of a gas-drive field. It is a further object of my invention to provide an improved apparatus for treating and producing oil-water wells, utilizing a fluid of lighter specific gravity than the water for forcing down the well the water in the latter, and thereafter producing the well under correlated conditions of back pressure and production rate. It is still a further object of my invention to provide an improved apparatus for treating and producing oil-water wells by means of which such wells are subjected to an improved treatment for promoting a restratification in the producing formation. It is yet another object of my invention to provide an improved apparatus for treating and producing oil-water wells, utilizing a liquid of lighter specific gravity than the water of the well for forcing down the well the water in the latter and thereafter effecting and maintaining a restratification of the fluids in the producing formation. It is another object of my invention to provide an improved apparatus for treating and producing oil-water wells, utilizing gaseous pressure and a suitable liquid cap for forcing down the well the water therein, and subsequently creating and maintaining a restratification of the fluids in the producing formation. Another object of the invention is to provide an improved apparatus for establishing a back pressure in an oil-water well, and producing the well under the back pressure so provided. It is, again, an object of my invention to provide an improved apparatus for treating and producing oil-water wells where the quantity of water that must be handled with ordinary production methods is very large. It is another object of my invention to provide an improved apparatus for treating oil-water wells having a relatively high formation pressure in relation to their depth, enabling them to resume production by natural flow. It is a still further object of my invention to provide an improved apparatus for treating and producing oil-water wells according to a method which includes the step of forcing down the well, with a column of lighter liquid, the water in the well, and comprising an improved apparatus for effecting the introduction of the liquid column so utilized.

In the accompanying drawings, in which, to facilitate understanding, there are presented certain relatively diagrammatic showings of different embodiments of my invention—

Fig. 1 is a diagrammatic view of an embodiment utilizable in the practice of my invention when a liquid is the forcing-down agent and the hydrostatic head of the liquid provides the required pressure, the scale of the drawing below the uppermost break being slightly larger than above.

Fig. 2 is a similar view, showing diagrammatically an embodiment utilizable when a liquid is in the forcing-down agent and a portion at least of such liquid must be forced into the well to drive down the water in the latter.

Fig. 3 is a view showing diagrammatically an embodiment by means of which a liquid may be introduced by gravity flow, and cumulatively acting gaseous and hydrostatic pressures effect the forcing-down operation.

Fig. 4 is a diagrammatic view showing illustrative means utilizable, in part, in superimposing gaseous pressures on liquid caps introduced into the well.

Referring to Fig. 1, a well 1 is shown having a casing 2 terminating in an impervious stratum 3 overlying the producing formation 4. The bore 5 of the well is shown extending for a substantial distance into the formation. Within the casing is a tubing 6 carrying at its lower end a pump 7 which may be of any suitable type and which is herein shown, for purposes of illustration, as of the sucker-rod-actuated type; and the sucker rod line 8 extends upwardly through the tubing to a point at the surface. The sucker rod is shown as connected to a "horse head" A, carried at one end of a walking beam B, pivotally mounted as at C upon a Samson post D. The walking beam is rocked through a pitman E adjustably connected to the multi-holed crank F of a power transmission unit G, which may be of a multi-speed type and be driven from a motor or any other suitable source of power not shown, as through the belt H. The casing head 10 is shown provided with a line 11 controlled by a valve 12 and having valve-controlled branches 13 and 14, respectively adapted to deliver the casing head gases to any desired point and to permit convenient venting of the casing head pressure if desired. The tubing 6, as shown, carries at its top a fitting 16 from which a valve-controlled line 17 leads off. The line 17 is shown branched, and the branch 18 may lead to a suitable treating system or any other desired point, while the branch 19 is valve-controlled and serves to permit venting of the tubing if desired.

Additional equipment to be used in the practice of my invention is provided, and this may be installed when the well is completed, when the ultimate application of my improved method of treating and producing a well is foreseen, or may be installed at old wells at the time the method is to be applied.

For the introduction of a fluid medium for driving down the liquid column in the casing, there is shown means by which such a liquid agent may be introduced into the tubing, into the casing, or into both. Introduction through the tubing presupposes a temporary removal of the pump, or some other arangement to enable the discharge of the liquid agent through the tubing into the well. Herein a valve-controlled line 21 leads to the top of the tubing, and a valve-controlled line 22 leads to the casing head, while a line 23 constitutes a common supply line for delivering a liquid agent to the connections 21 and 22. Herein I have shown the supply line 23 leading to a tank 24, which may represent any suitable source of crude oil.

It will be evident that the piping connections and controls shown are wholly diagrammatic and that they may be widely varied within the scope of my invention, and that, for example, single connections with the casing head and the top of the tubing migh be made to serve both supply and discharge functions merely by rearranging the piping and its fittings.

In other figures treating-agent delivery lines and lines for handling the gaseous and liquid discharge of the well are also shown diagrammatically, and throughout the drawings wherever similar parts are disclosed like reference numerals will be applied.

During the operation of the well prior to treatment and production thereof according to the method applied with this embodiment of my invention, the sucker rod line 8 operates the pump 7 and effects discharge from the well, through the line 17, of crude oil and water. These liquids may be delivered to any desired point; and the casing head pressure may be maintained high or low, as desired, for example, by adjustment of the valve 12.

This well may be regarded, for purposes of illustration, as a rather deep one, having a considerable formation pressure but not one sufficient to offer any possibility of production without pumping. Prior to the initiation of treatment of this well, the production of the latter may be assumed to have comprised rather serious quantities of water with some oil, and the pumping equipment, under such circumstances, will have been pressed, perhaps, to near the limit of its capacity to secure enough oil to warrant continued pumping, in view of the high percentage of water in the well discharge. If such a well is shut down, a column of oil and water will stand comparatively high in the casing, the water component extending from the bottom of the well to a point materially above the top of the producing sands 4, and a mere shutting in of the well would not, in any commercially practicable time, result in any change taking place which would cause an improved production of oil upon resumed pumping.

A well of the assumed characteristics of the well 1 requires pumping after as well as before treatment. Therefore, prior to the introduction of a fluid to force down the liquid column, the pump 7 and the operating means for the sucker rod line 8 will desirably be modified and adjusted, as by reducing the size of the pump plunger and providing for a less rapid reciprocation of the sucker rod line 8 and shorter strokes of the latter, so that upon the resumption of pumping a much slower discharge rate will be possible. For example, the lower end of the pitman will be connected nearer the axis of rotation of the drive crank, and changes may be made in the transmission between the motor and the power transmission unit or in the gearing of the latter.

To effect the introduction of a column of liquid of lower specific gravity than the water in the well, the casing head pressure will be reduced to the necessary degree, as by opening the valve-controlled discharge line 14; and then a quantity of crude oil, for example, a quantity which when confined in a column of a cross section equal to that of the casing will exert a force equal to or slightly in excess of the bottom-hole pressure, will be flowed from the source 24 through the line 23 and through the line 22 into the casing to act upon the liquid column standing in the latter. As the crude oil is added to the top of the liquid column in the well, the bottom of the original liquid column will be forced back into the formation; and as more and more oil enters the casing the lower end of the column of oil which stands above the top of the water column will approach and finally pass below the top of the oil sands and commence to enter the latter and to displace the water from the well bore within the sands and from some, at least, of the uppermost water-sealed oil delivery passages in the sands. The oil column in the casing will not have its upper end move in the casing down to a point below the limit fixed by the formation pressure; and it is possible that a considerable time may be required to effect the introduction of the desired total quantity of oil and the attainment of a balance between the formation pressure and the pressure exerted by the oil column in the well.

After the oil has been introduced, and preferably also after the end of the forcing-down action has been reached, the well may desirably be shut in for a time, as by closing the valves in the several lines 11, 17, 21 and 22, this shut-in period varying with the quantity of oil introduced and with the severity and duration of the previous water-producing condition. A shut-down of all pumping until the day following the completion of the introduction of the oil may be selected as a convenient, though by no means a fixed, minimum, when this step is regarded as advisable. This will provide an opportunity for the more definite establishment of restratification.

Following the period of complete inactivity, so far as production is concerned—when such a period is provided—a very slow production may be initiated. The pump will be positioned preferably with its intake above the top of the oil sands; and pumping at a slow rate compared to that which would be sufficient to effect the discharge of the oil component only of the prior delivery, may be started and maintained for a time to insure still more definitely the effecting of a restratification of the fluids within the producing formation.

Thereafter, the pumping speed will be increased, as by lengthening the pump stroke through changing the pitman's connection to the crank, until the maximum safe rate of production is attained. In increasing the rate of production, the pumping speed should be increased only at intervals, and each new rate should be maintained long enough for sub-surface conditions to become stabilized.

If desired, the rate of production may be deliberately increased until water again begins to appear in substantial quantity. This will enable the experimental determination of the limit beyond which pumping cannot be advantageously pushed. The whole process may then be repeated and the production rate set, with the information so obtained, so that the maximum practicable quantity of oil may be secured.

It will be understood that correlation of the rate of production and of the back pressure—in this instance determined, at least largely, by the height of the column of oil in the casing (which will vary with the pumping rate and the relation of the latter to the rate of liquid discharge into the well from the formation)—will maintain the production at least mainly oil.

The quantity of crude oil employed in the first step of the process may vary widely from the amount hereinabove tentatively suggested, but ordinarily the quantity mentioned will prove adequate, and experience and knowledge gained at similar wells in the same field will afford guidance as to possible modification in the volume to be employed.

Instead of introducing the liquid-forcing agent by gravity flow after a lowering of the casing head pressure, this agent may be forced into the well by imposing upon it the necessary pressure. Such a procedure will be found advantageous where the formation pressure is high enough, with respect to the depth of the well, to permit production by natural flow to be resumed upon the substantial elimination of water from the well discharge. An apparatus suited to those conditions may be explained by reference to Fig. 2, disregarding the dotted disclosure of the sucker rod and its gland or stuffing box in that figure.

The well and its equipment in Fig. 2 in the main follow the disclosure of Fig. 1. Provision is made for liquid discharge from the tubing 6 and for gas discharge from the casing head 10; for the shutting in of the casing head and for the closing off of the usual discharge for liquid from the tubing; and for the introduction of a treating agent into either the tubing or the casing or both. Instead of provision for the gravity flow of crude oil to the connection 21 or 22 in Fig. 2, I have shown diagrammatically means for drawing crude oil from a storage receptacle 24 through a line 31, means for placing it under pressure, as by a pump 32, and means for discharging it, the line 33, which may supply fluid either, through the line 21 to the tubing 6 or through the line 22 to the casing 2.

Where it is to be expected, from the knowledge possessed of the formation pressure and the depth of the well, that production by natural flow can be reestablished when the water discharge is substantially eliminated, the pump 7 and its actuating devices may be removed, a condition which is suggested by the dotted showing of the sucker rod line and its gland in Fig. 2; and prior to the initiation of well treatment the bottom of the tubing 6 will advantageously be positioned above the top of the producing formation 4. The various connections for liquid and gas discharge from the well will then be closed, and the pressure applying means, represented by the pump 32, will be caused to force the liquid treating-agent, for example, crude oil, through the connections 21 and 22 into the well, and to drive down in the tubing and in the casing the liquid columns standing therein. A forcing means of suitable capacity to impose the necessary pressure on the introduced liquid to force it into the well will, of course, be provided. The pressure necessary will be a matter of simple calculation, knowing, for example, the formation pressure or the depth of the well, the mean specific gravity of the liquid column and the height at which the latter stands when the casing head pressure is vented. The top of the tubing will, of course, be capped prior to the forcing in of the treating liquid if production without pumping it to be effected.

As the column of oil is forced into the well, it will progressively displace into the formation the liquid which previously stood in the well. When all of that liquid or, if it is stratified, the lower (water) portion thereof, has been forced below the top of the producing formation, there will be a continuous column of oil from the top of the casing down to and into the formation; and the oil in the casing will effect a junction with the oil in the sands and will displace the water from at least some of the water-sealed passages and produce a condition where restratification of the fluids in the formation can take place. The well may then, if desired, be shut in by the closing of the necessary valves and allowed to stand for a period in order to promote the initiation of restratification. Thereafter, if a period of very slow production of oil for the purpose of effecting circulation within the formation and the displacement from the oil channels of the water seals therein be desired, it will be possible by throttling the rate of production through the line 17 to maintain the necessary back pressure and to hold in check the rate of production to accomplish the desired result. Subsequent production at higher rates will be possible, when this is indicated, merely by increasing the rate of oil delivery permitted through the line 17. Should the rate of production be allowed inadvertently to become too high, or be deliberately allowed to proceed to such a degree as to initiate the return of water to the well discharge, for the purpose of determining the maximum safe rate of production, a reapplication of the process will restore the well to a substantially exclusive oil production.

It will be evident that the crude oil or other liquid agent may be forced into the well either when the latter has a column of liquid of considerable height standing therein (a condition which follows protracted reduction of the casing head pressure), or at a time when the gaseous casing head pressure is high, through the well's having been shut in for some time. Under the latter conditions, the gaseous pressure in the casing will force the treating liquid, as the latter is introduced by the forcing instrumentality into the well, downwards, and thereby displace the lower liquid column originally standing within the well. When this has been completed to the necessary degree, it will be evident that upon resumed production the well must rely rather largely upon a gaseous back pressure unless steps are adopted to effect a replacement of the gaseous back pressure, or the combined gaseous and liquid back pressure, by a primarily, at least, liquid back pressure. This can be done readily by allowing the gaseous casing head pressure to be bled off at a rate so restricted that oil ingress into the well from the formation will cause a column of oil to build up in the well as the gaseous pressure is reduced, and thereby maintain the desired back pressure upon the formation.

When the depth of the well and the depletion of the formation pressure are such that production by natural flow will be impracticable, and the embodiment of the invention described with the aid of Fig. 2 is to be applied, the pumping equipment, whose presence is indicated by the dotted sucker rod line stuffing box, will, before the liquid agent is introduced into the well, be modified and readjusted to enable, upon resumed production, slow enough rates of pump operation to bring about the needed restratification and to maintain the rate of liquid production within the rate of oil influx into the well. Here it will be understood that the quantity of liquid, e. g. tank oil, will not be sufficient wholly to fill the casing, even when a column of sufficient height to drive down the water, by its weight, is introduced; and the quantity of the liquid agent may be varied, as more fully explained in connection with later embodiments of the invention, depending upon the relative reliance it is desired to place upon hydrostatic and gaseous pressures for the forcing-down action.

Fig. 3 illustrates another embodiment of the invention. Here, it will be observed, the discharge lines for the liquid production of the well and for casing head gases are shown leading to the left from the top of the well; and at the right of the well is shown equipment which can be used for enabling the introduction, by gravity flow, of a liquid to act upon the top of the liquid column in the well, though the well may be under pressure—and this without the need for means for imposing mechanically upon the liquid a pressure to overcome the pressure against which it is to be introduced. A valve-controlled line 35 is provided to permit delivery of the liquid to be introduced from any suitable source, herein represented by the oil tank 24, to a receptacle or vessel 36 so positioned as to permit gravity flow from it into the casing or tubing, or both, respectively through the valve-controlled line 37, the valve-controlled line 38, or both. A vent, suitably valve-controlled, is shown at 39, and means for introducing a pressure to enable gravity flow of the liquid within the vessel 36 into the well, or to exert, if desired, a superior pressure upon it, is provided in the form of the valve-controlled line 40, to which casing head pressure may be admitted through the valve-controlled line 41 leading to the casing head, or to which any suitable gaseous pressure may be delivered from any available source by way of the valve-controlled supply line 42, when a somewhat different modification of the invention is desired to be employed. While but one vessel 36 is illustrated, it will be evident that use of a number, aggregating the necessary capacity, or use of a single vessel large enough to hold the entire needed quantity of treating liquid, or use of a small vessel repeatedly, are all within the scope of my invention. Before introduction of the liquid by means of the equipment illustrated in Fig. 3, provision will be made to enable slower displacement of liquid by the pumping equipment. These details need not be described again.

The lines 11 and 17 being closed, there will exist a pressure within the top of the well (i. e. in the casing head) which will depend upon the formation pressure and the height of the liquid column standing in the well. With each of the valve-controlled lines 37, 38 and 40 closed, the vent line 39 from the vessel 36 will be opened, and the desired quantity of liquid of lighter specific gravity than the water in the well will be flowed through line 35 into the vessel 36. Lines 35 and 39 will then be closed, and line 40 opened, and casing head pressure admitted through line 41 to the top of the vessel 36. As previously indicated, a suitable pressure could be supplied, if preferred, through line 42, for example, from sources such as are described in connection with Fig. 4. Lines 37 and/or 38 will be opened, following, or concurrently with, the application of the needed gaseous pressure on the top of the liquid in the vessel 36, and the liquid will then flow through the open delivery line or lines into the well, and will force down the previous liquid column in the well and move the water in the well to a position below the top of the formation 4. It will of course be understood that where liquid introduction to the well through the line 38 is to be effected, removal of the pump will have been necessary, unless some arrangement be made to enable liquid to pass the pump valves.

Following the introduction of the necessary quantity of liquid and the completion of the downward displacement of the water within the well, the well may be shut in for a time; slow pumping to effect a circulation which will clear the water-sealed oil passages carried on for a time; and the well thereafter produced at an appropriate rate and under the necessary back pressure to confine the production to oil as may be desired. Detailed rediscussion of these steps is unnecessary. It should be noted that the quantity of liquid—e. g. crude oil—introduced may be either sufficient per se wholly to displace the entire previous liquid column in the well or, as more fully considered in connection with another modification, a lesser quantity, to provide a cap of the necessary depth, as may be determined.

Fig. 4 is intended to show, in the simplest possible manner, equipment by means of which, as a first step, a cap of a liquid of lower specific gravity than the water of the well is introduced into the latter and then subjected to gaseous pressure to force it downwardly. Obviously the gaseous pressure may be provided by a compressor—in which event maintenance of a gaseous back pressure by suitable control of the compressor is possible—by a well having a higher casing head pressure than the well being treated, by a gas main containing gas at the requisite pressure, such as the residue line from a gasoline plant or a booster station line, or even, under some conditions, by simply shutting in the well and allowing the pressure which will thereupon build up in the casing head to provide the needed pressure. Other potential sources of gaseous pressure will be evident to those skilled in this art.

In Fig. 4 two potential sources of the needed gaseous pressure are indicated. A compressor L having an unloader-controlled intake M adapted to conduct to the compressor any suitable gaseous fluid, is driven by an engine N and discharges to a receiver O having appropriate valve-controlled connections with a line 45, hereinafter referred to. Another valve-controlled line P may serve to permit introduction into the pipe 45 of a suitable gaseous pressure from some such source as another well, a gas main, etc. A suitable pilot valve Q, controlling the passage of pressure (through the line R) from the line 45 to the unloading mechanism and venting of the unloading pressure, may be employed to control the compressor discharge pressure and maintain it at the height necessary to effect the forcing-down operation, or, optionally, at the height to provide a desired back pressure.

As in earlier figures, the usual liquid discharge line from the well is indicated at 17, and the provisions for conducting away the casing head gases to a point of use or storage, at 13, and for venting the casing head, at 14, respectively. A pump, actuated in any suitable manner—a walking-beam actuation is indicated for illustration—is shown at 7. The line 45, previously mentioned, constitutes a means for delivering gaseous pressure from any suitable source to either or both of the valve-controlled lines 46 and 47 leading to the top of the tubing and to the casing head respectively. The source of supply 24 for the desired quantity of liquid treating-agent is connectible herein through the line 23 and its valve-controlled branches 21 and 22 to the lines 17 and 11 respectively, these latter serving as well for liquid ingress lines as for liquid and gas discharge lines respectively. Obviously many variations of these connections, which are shown for illustration only, are possible.

The embodiment of the invention now being described is not limited to, but will be found very desirable under conditions where the bottom-hole pressure is comparatively low. Of course, however, provided higher gaseous pressures be economically available, and the casing and other equipment be able to withstand such pressures, these embodiments may be applied as well to wells having higher bottom-hole pressures.

As in the other forms of the invention above described, it will be desirable to reduce the displacement of the pump plunger, to shorten the stroke of the latter, and to arrange for a slower rate of pump operation; and also to alter the location of the pump intake, if necessary, to insure the latter's being in liquid and not in gas when the process is applied. Desirably, the necessary changes will be made before the gaseous pressure is applied.

When there is in the well a natural oil cap, and this is augmented by an extraneously introduced cap of liquid of lower specific gravity than the water in the well, this will ordinarily greatly improve the results of the process; and whenever it is believed that the cap of crude oil upon the column standing in the well prior to the application of my process thereto is likely to be inadequate or its quantity is problematical, or when the use of a lower gaseous pressure is desirable for any reason, or when operation under maintenance of a substantial casing head pressure is important for any collateral reason, or when it is desired to make use of gaseous pressure accumulating from and within the particular well to be treated as at least in part the pressure agency, the extraneous introduction of a cap of liquid will be desirable, though it may not be imperative.

When, if this is to be done, the liquid cap has been introduced into the well, as through the lines 23, 22 and 11, one or the other of the lines 46, 47—usually the line leading to the casing head—will be opened, and gaseous pressure will be delivered into the well, say, from the receiver O, or through the line P, to act upon the liquid cap which has been introduced into the latter. By continuing the supply of gaseous pressure so that the casing head pressure will increase, it will be evident that the cap of lighter liquid will be forced down the well and brought into contact with the upper portion, at least, of the formation, and drive the water down into the latter. When shutting in the casing head and building up the pressure from within the well is relied upon, added time must usually be counted on; and when the casing head pressure reaches the magnitude computed to be necessary, when superimposed on the cap of known height, to overcome the bottom-hole pressure, it will be evident that the liquid cap will have been forced down as necessary.

The other steps heretofore described may then be applied, and after a period of shutting in the well the pump may be started as hereinabove described, while the gaseous pressure is maintained in balance with the apparent pumping head, as through control of its escape, by compressor control, etc.; and subsequent operations will then be similar to those described in the case of such other practices.

Where it is desired to replace the gaseous pressure with a back pressure imposed by oil from the formation, after the maintenance for the desired period of the undisturbed state, during which the gaseous pressure is maintained and initial restratification advanced, the gaseous pressure can be slowly reduced at a rate that at least will not exceed the effect of the initial pumping speed which is to be used, and in this way a flow of oil from the formation into the well will be induced. The oil will rise in the well and take the place of the gaseous pressure until all the back pressure is supplied by the column of oil. Thereafter, the reinitiation of slow pumping etc., as hereinbefore described may be applied. Generally, the type of back pressure maintenance employed will depend upon the desirability, for collateral reasons, of having a high casing head pressure. If desired, after an oil column has been built up in the well, this may be forced down to insure a more certain reconditioning, and the shutting in, slow producing, and more rapid producing procedures applied.

It will be noted that apparatus adapted for the use of liquids and cumulatively acting liquids and gases have been disclosed. Apparatus for the maintaining of back presure with liquids supplied from without or produced from within the formation, with liquids and gases acting cumulatively, or with gases, has been disclosed. Ultimate controlled production by natural flow under back pressure and by pumping under back pressure have been explained. And it will be understood that while I have specifically illustrated a beam-actuated reciprocating pump, rotary or reciprocating pumps, beam or motor actuated pumps all may be used when desired.

This is a continuation-in-part of my applications Serial No. 96,236, filed August 15, 1936, and Serial No. 131,203, filed March 16, 1937.

While there have been specifically described in this application a plurality of embodiments of this invention, it will be understood that these have been disclosed for purposes of illustration and that the invention may be further modified and practiced in other forms without departing from its spirit or the scope of the appended claims.

What I claim as new and desire to secure by Letters Patent is:

1. In combination, in an apparatus for effecting oil delivery from an oil-water well, means for mechanically pumping such a well, means for introducing into such a well a quantity of fluid of lighter specific gravity than the mixture of oil and water therein, and means for effecting the building up of a gaseous formation pressure upon the top of the fluid so introduced to force back into the oil stratum the liquid within the well, said means for mechanically pumping the well having means for regulating the rate of effective operation thereof.

2. In combination, in an apparatus for effecting oil delivery from an oil-water well, means for mechanically pumping such a well, and means for introducing into such well a quantity of a liquid of lighter specific gravity than the mixture of oil and water therein while said well remains under pressure including means for storing at the top of such well a quantity of such liquid and equalizing the pressure upon the top of said liquid with the pressure in said well and permitting gravitational flow of such liquid into said well to force back into the formation the liquid within the well, said means for mechanically pumping the well having means for adjusting thereafter the rate of effective operation thereof.

3. In combination, in an apparatus for effecting oil delivery from an oil-water well, means for pumping such well, means for introducing into such well a quantity of liquid of lighter specific gravity than the mixture of oil and water therein, and means for subjecting the liquid so introduced to a gaseous pressure from another well in which a higher formation pressure exists to force said liquid into the oil stratum, said means for mechanically pumping the well having means for thereafter regulating the rate of effective operation thereof.

4. In combination, in an apparatus for treating and producing an oil-water well which contains a liquid column comprising water in at least its lower portions and including an overlying oil cap, means for introducing into the well a column of oil of such a height as when superimposed upon the liquid in the well to establish a column of oil in the well above the water of a height sufficient to overbalance the formation pressure, and means for producing the well under a back pressure with the rate of production and the back pressure correlated to preclude the building up of a water component in the well discharge in excess of a predetermined percent.

5. In combination, in an apparatus for treating and producing an oil-water well, means for introducing into the well a quantity of a liquid of lower specific gravity than the water therein sufficient when introduced into the casing to exert a hydrostatic pressure at least equal to the formation pressure, and means for producing the well thereafter under a back pressure provided by the fluid contents of the well and at a rate correlated to such back pressure to preclude a proportion of water in the well discharge in excess of a predetermined percent.

6. The combination set forth in claim 5 together with means for shutting in the well for a period between the introduction of said liquid and the setting in operation of said producing means.

7. The combination defined in claim 5 in which the means for producing the well is provided with means enabling the subjection of the formation to a comparatively low rate of oil production under a back pressure prior to the establishment of the higher rate of production thereafter applied.

8. In an apparatus for treating and producing an oil-water well, means for effecting reconditioning of the well and the contiguous producing formation including means for forcing into the well a quantity of crude oil sufficient to fill the well completely full from the casing head to a point below the top of the producing formation, and means for subsequently initiating production from the well under natural flow while controlling the discharge rate to maintain a back pressure on the formation and hold the percentage of water in the liquid produced from the well below a predetermined maximum.

9. In combination, in an apparatus for treating and producing an oil-water well, means for effecting the establishment within the well of a substantial gaseous pressure, means for introducing into the well a cap of a liquid of lower specific gravity than the water in the well and of such height that the hydrostatic pressure of the cap and the gaseous pressure within the well are effective to force down the liquid previously standing in the well and displace the water in the well into the producing formation, and means for thereafter producing said well, while maintaining a back pressure thereon, at a rate correlated to said back pressure to preclude the building up of the water component of the well discharge above a predetermined percentage.

10. In combination, in an apparatus for treating and producing an oil-water well, means for introducing into the well a liquid of lower specific gravity than the water in the well, means for establishing a gaseous pressure in the well which together with the pressure of the liquid, at least equals formation pressure, means for closing the well for a period, and means for producing the well at different rates at least the first of which is materially below the previous rate of production of oil alone from the well, said apparatus including means for maintaining the well under a back pressure sufficient to preclude excessive discharge of water.

11. In combination, in an apparatus for treating and producing an oil-water well, means for introducing into the well a liquid of lower specific gravity than the water in the well in sufficient quantity to drive down the water, means for thereafter shutting in the well, and means for pumping the well first at a comparatively slow rate and subsequently at a higher rate, said apparatus including means for maintaining a back pressure upon the formation throughout pumping at said different rates effective to preclude the appearance of an excessive amount of water in the well discharge.

JOHN F. KENDRICK.